US009193609B2

(12) United States Patent
Morningstar, Jr. et al.

(10) Patent No.: US 9,193,609 B2
(45) Date of Patent: Nov. 24, 2015

(54) MIXING DEVICE FOR OPEN CHANNEL UV WATER TREATMENT PLANTS

(71) Applicant: XYLEM WATER SOLUTIONS HERFORD GMBH, Herford (DE)

(72) Inventors: Leroy Jack Morningstar, Jr., Charlotte, NC (US); Sven Kämmerer, Bad Salzuflen (DE)

(73) Assignee: Xylem Water Solutions Herford GmbH, Herford (DE)

( * ) Notice: Subject to any disclaimer, the term of this patent is extended or adjusted under 35 U.S.C. 154(b) by 0 days.

(21) Appl. No.: 14/398,638

(22) PCT Filed: Mar. 6, 2013

(86) PCT No.: PCT/EP2013/000653
§ 371 (c)(1),
(2) Date: Nov. 3, 2014

(87) PCT Pub. No.: WO2013/164048
PCT Pub. Date: Nov. 7, 2013

(65) Prior Publication Data
US 2015/0115171 A1    Apr. 30, 2015

(30) Foreign Application Priority Data
May 4, 2012   (DE) .................... 10 2012 008 732

(51) Int. Cl.
*C02F 1/00* (2006.01)
*B01F 5/06* (2006.01)
*C02F 1/32* (2006.01)

(52) U.S. Cl.
CPC ............ *C02F 1/325* (2013.01); *B01F 5/0602* (2013.01); *B01F 5/0616* (2013.01);
(Continued)

(58) Field of Classification Search
CPC ............ C02F 1/325; C02F 1/006; C02F 1/32; B01F 19/123; B01F 5/0618; B01F 5/061; B01F 5/0617; A61L 2/10
USPC ................... 250/435, 436, 437, 438, 455.11, 250/454.11, 504 R; 366/337, 336, 174.1, 366/158.5
See application file for complete search history.

(56) References Cited

U.S. PATENT DOCUMENTS 3,079,498 A * 2/1963 Ruffin ........................ 250/430
3,182,193 A * 5/1965 Marx et al. ................. 250/430
(Continued)

FOREIGN PATENT DOCUMENTS

EP           0893411 A1 *  1/1999  ............... C02F 1/32
EP           0 893 411 B1    4/2004
(Continued)

OTHER PUBLICATIONS

International Search Report, dated Jul. 15, 2013, corresponding to International Patent Application No. PCT/EP2013/000653, filed Mar. 6, 2013.
(Continued)

Primary Examiner — David A Vanore
(74) Attorney, Agent, or Firm — RatnerPrestia

(57) ABSTRACT

A mixing device for a water treatment facility with an open channel, with a base body which is designed in a plate-shape or strip-shaped manner for attachment to a wall of a channel such that a lower face which faces towards the wall of the channel during operation and an upper face which faces away from the wall of the channel during operation, whereby a plurality of protrusions is provided which extend from the base body, which are inclined away from the lower face and which extend over a plane formed by the upper face, and in that a plurality of recess is provided, and whereby each recess is arranged between two adjacent protrusions.

9 Claims, 3 Drawing Sheets

(52) U.S. Cl.
CPC .. *B01F 2005/0638* (2013.01); *C02F 2201/328* (2013.01); *C02F 2201/3225* (2013.01); *C02F 2201/3227* (2013.01); *Y02W 10/37* (2013.01)

(56) References Cited

U.S. PATENT DOCUMENTS

| | | | | |
|---|---|---|---|---|
| 3,212,992 | A * | 10/1965 | Salesse et al. | 376/454 |
| 3,923,288 | A * | 12/1975 | King | 366/336 |
| 3,924,139 | A * | 12/1975 | Hirose et al. | 422/186.3 |
| 4,040,256 | A * | 8/1977 | Bosche et al. | 405/119 |
| 4,849,115 | A * | 7/1989 | Cole et al. | 210/748.15 |
| 5,019,256 | A * | 5/1991 | Ifill et al. | 210/232 |
| 5,208,461 | A * | 5/1993 | Tipton | 250/436 |
| 5,423,608 | A * | 6/1995 | Chyou et al. | 366/337 |
| 5,489,153 | A * | 2/1996 | Berner et al. | 366/337 |
| 5,614,723 | A * | 3/1997 | Oppenlander et al. | 250/435 |
| 5,800,059 | A * | 9/1998 | Cooke et al. | 366/337 |
| 5,813,762 | A * | 9/1998 | Fleischli et al. | 366/337 |
| 6,015,229 | A * | 1/2000 | Cormack et al. | 366/336 |
| 7,001,571 | B2 * | 2/2006 | Forney et al. | 422/22 |
| 7,097,764 | B2 * | 8/2006 | Neofotistos | 210/192 |
| 7,166,850 | B2 * | 1/2007 | Brunet et al. | 250/436 |
| 7,615,160 | B2 * | 11/2009 | Collins et al. | 210/748.11 |
| 7,960,705 | B2 * | 6/2011 | Fraser et al. | 250/436 |
| 8,066,424 | B2 * | 11/2011 | Ruscheweyh et al. | 366/174.1 |
| 8,269,190 | B2 * | 9/2012 | Dornblaser et al. | 250/455.11 |
| 8,459,861 | B2 * | 6/2013 | Bircher | 366/158.5 |
| 2005/0224335 | A1 * | 10/2005 | Carmignani et al. | 204/157.15 |
| 2008/0121812 | A1 * | 5/2008 | Bircher | 250/435 |
| 2015/0115171 | A1 * | 4/2015 | Morningstar et al. | 250/435 |

FOREIGN PATENT DOCUMENTS

| | | | |
|---|---|---|---|
| JP | 2001 212214 A | 8/2001 | |
| WO | WO 00/67887 A2 | 11/2000 | |
| WO | WO 02072480 A1 * | 9/2002 | C02F 1/32 |
| WO | WO 2008055344 | 5/2008 | |
| WO | WO 2008055344 A1 * | 5/2008 | C02F 1/32 |
| WO | WO 2008119865 | 10/2008 | |
| WO | WO 2010115276 A1 * | 10/2010 | C02F 1/30 |

OTHER PUBLICATIONS

International Preliminary Report on Patentability, dated Nov. 4, 2014, corresponding to couterpart International Patent Application No. PCT/EP2013/000653, filed Mar. 6, 2013.

* cited by examiner

MIXING DEVICE FOR OPEN CHANNEL UV WATER TREATMENT PLANTS

CROSS-REFERENCE TO RELATED APPLICATIONS

This patent application is a U.S. National Phase Patent Application of PCT Application No. PCT/EP2013/000653, filed Mar. 6, 2013, which claims priority to German Patent Application No. 102012008732.2, filed May 4, 2012, each of which is incorporated by reference herein in its entirety.

FIELD OF THE INVENTION

The present invention relates to a mixing device for a water treatment facility with an open channel, with a base body which is designed in a plate-shape or strip-shaped manner for attachment to a wall of a channel such that a lower face which faces towards the wall of the channel during operation and an upper face which faces away from the wall of the channel during operation are provided, wherein a plurality of protrusions is provided which extend from the base body, which are inclined away from the lower face and which extend over a plane formed by the upper face, and in that a plurality of recesses is provided, whereby one recess is arranged between two adjacent protrusions respectively; and a UV water treatment facility with a channel which is open at the top and a number of elongated and tube-shaped UV emitters arranged in the channel, whereby the channel has two side walls and a base wall, and whereby the UV emitters are designed parallel to the side walls and not parallel to the base wall, wherein at least one mixing device with a plurality of protrusions is arranged on a side wall parallel to an emitter in such a manner that the protrusions protrude into the free cross section of the channel during operation.

BACKGROUND OF THE INVENTION

It has been known for a long time that UV radiation has a germicidal effect and that the naturally occurring UV radiation in sunlight has a disinfecting effect at sufficient intensity and duration. UV radiation is used in small and large facilities for the disinfection of water and waste water. It is possible to distinguish between facilities in which UV emitters are arranged in closed channels and facilities in which the UV emitters are in channels which are open at the top, known as open channels. The second type of construction with open channels is primarily used in waste water technology. The purified waste water is guided through an open channel into the UV system and exposed to UV radiation in order to reduce the number of germs to a level such that the purified waste water can, for example, be discharged into normal waters. The level of disinfection can be so high as to allow the water to be discharged into bathing water.

Waste water treatment facilities are normally designed so that the water flows from an inlet through the various different treatment levels to an outlet solely by the force of gravity, without the need for any pumps. For this reason, in UV treatment systems in waste water technology too, the aim is to keep the flow resistance as low as possible in order to achieve as low a loss in pressure as possible from the intended throughflow rate. In the operation of the facility, a loss of pressure of this type would manifest itself as a height difference between the water level in the inlet and the water level in the outlet. The aim is to keep this height difference as low as possible.

Otherwise, the disinfection capacity of the system must be ensured, with the level of effectiveness of the system being expressed in the ratio between disinfection achieved and electrical power used. This level of effectiveness should be optimised for economic reasons. For this reason, UV emitters, which are generally elongated gas discharge lamps, are placed in the channel, preferably in rows transverse to the flow. Several rows are arranged one after the other and offset against one another such that the emitters in one row are arranged in the centre between the emitters in the row arranged upstream. The water that flows between the first emitters will then hit the subsequent emitter which is in the centre behind the gap. This arrangement results in different spaces between the emitters in the different rows and the lateral, adjacent wall of the channel. In areas in which there is a large gap between the emitter and the wall of the channel, the dose of radiation is lower than in the other areas. This effect should be compensated for in order that every flow pathway which can occur in practice receives a sufficient and, where possible, equal dose of UV.

Various different solutions for this are known from the prior art. Essentially, the known solutions are based on continuous, beam-shaped elements with various different cross sections being arranged on the wall of the channel which reduce the space between the adjacent UV emitter and the wall of the channel, thereby narrowing the gap there. Document . . . for example shows a channel with four rows each of four UV emitters which are arranged one after the other in the flow direction and the flow passes by them transverse to their longitudinal axis. In the open channel, the emitters therefore hang vertically. A rib with a triangular cross section is arranged next to the emitter which is the farthest from the wall, which rib narrows the cross section of the gap between the wall and the emitter through which water can flow freely. Document WO 2008055344 A1, which is incorporated by reference herein, shows various different solutions which also work with ribs with a triangular cross section, whereby the ribs on the one hand narrow the free cross section and on the other deflect the flow.

Document EP 0893411 B1, which is incorporated by reference herein, shows a solution in which an L-shaped profile is arranged laterally on the wall of the channel and here, with the rows of UV emitters arranged behind one another and offset against one another in the area where the UV emitter closest to the edge is farthest away from the wall of the channel. The L-profile is arranged continuously along the entire length of the adjacent emitter on the wall. It deflects the water flow in this area essentially completely. The aim here is to divert the flow of the water in the edge area completely to the emitter arranged at a distance from the wall.

The technical solutions described therefore aim to impact the flow pathways of the water or waste water flowing through the channel such that in the area in which the radiation intensity is higher they also reach the areas where the emitter is at a greater distance from the adjacent wall of the channel. In practice, this results in two problems. On the one hand, the complete deflection of the flow pathways by the installations which extend with the same shaped cross section over the entire length of the adjacent emitter along the wall of the channel significantly narrows the free cross section of the channel, so the loss in pressure between the upstream side of the channel system and the downstream side of the channel system increases. On the other hand, the flow is accelerated in the region of these installations, so the flow pathways are deflected in the region in which there is higher intensity, but the length of time spent in this area is shorter. The goal of increasing the dose of UV applies to the flow pathway is not optimally achieved in this way.

SUMMARY OF THE INVENTION

It is therefore the object of the present invention to create a device to impact the flow in a UV water treatment facility which optimises the radiation of flow pathways along the edge in systems with rows of UV emitters which are arranged offset relative to one another. It is further the object of the present invention to create a UV water treatment facility in which UV disinfection with a particularly good level of efficacy is achieved and in which simultaneously the loss in pressure between the upstream side and the downstream side is as low as possible.

This object is achieved by a device with an open channel, with a base body which is designed in a plate-shape or strip-shaped manner for attachment to a wall of a channel such that a lower face which faces towards the wall of the channel during operation and an upper face which faces away from the wall of the channel during operation are provided, wherein a plurality of protrusions is provided which extend from the base body, which are inclined away from the lower face and which extend over a plane formed by the upper face, and in that a plurality of recesses is provided, whereby one recess is arranged between two adjacent protrusions respectively; and by a facility with a channel which is open at the top and a number of elongated and tube-shaped UV emitters arranged in the channel, whereby the channel has two side walls and a base wall, and whereby the UV emitters are designed parallel to the side walls and not parallel to the base wall, wherein at least one mixing device with a plurality of protrusions is arranged on a side wall parallel to an emitter in such a manner that the protrusions protrude into the free cross section of the channel during operation. Since the mixing device has a plurality of protrusions which extend into the free cross section of the channel during operation, and since a recess is provided between the protrusions in the direction of flow in each case, which recess is a cross section through which water can flow freely, and since the area ratio of the areas effective in the direction of flow between the protrusions and the recesses is <=1, the flow which impacts there can make contact with all of the sides of the protrusions and in particular also flow through the recesses, such that an effective level of turbulence and therefore a redistribution of the particles is achieved downstream of the recesses without increasing the flow speed to a negative extent and simultaneously as a result of the mixing device only causes a slight increase in the flow resistance, which is negligible in the operation and which in particular does not cause any significant drop in pressure between the upstream side and the downstream side of the facility.

Since in the UV water treatment facility in accordance with the invention a mixing device with protrusions and recesses is provided before or immediately adjacent to the UV emitters which are offset at a distance from the wall of the channel relative to the direction of flow, whereby the mixing device extends essentially parallel to the longitudinal axis of the UV emitter, a mixing of the flow pathways is created immediately next to the adjacent emitter, which mixing ensures a distribution of the pathogenic germs contained in these flow pathways. Germs which are transported in a flow pathway near to the wall of the channel are thereby guided closer to the UV emitters. What is crucial here is the fact that the total flow speed hardly increases at all and there is only a slight loss of pressure. The decreased flow speed compared to the prior art causes a higher UV dose for the pathogens there, since the UV dose, which is crucial for disinfection, is essentially the product of intensity and amount of time spent in the radiation area. The amount of time spent in the radiation area increases as the flow speed decreases.

In particular, this object is achieved by a mixing device for a water treatment facility with an open channel, with a base body which is designed in a plate-shaped or stripe-shaped manner for attachment to a wall of the channel such that a lower face which faces towards the wall of the channel during operation and an upper face which faces away from the wall of the channel during operation by a plurality of protrusions being provided which extend from the base body, which are inclined away from the lower face and which extend over a plane formed by the upper face, and by a plurality of recesses being provided, whereby one recess is arranged between each two adjacent protrusions.

The protrusions are preferably formed in one piece with the base body, for example from a single piece of stainless steel.

It is further advantageous if the protrusions and the recesses are arranged adjacent to one another in a straight line. This design is particularly simple to manufacture, for example using punching and bending.

It is also advantageous for a low flow resistance if in a projection in the direction of flow of the water to be treated the total area of the protrusions is less than or equal to the total area of the recesses. In particular, all protrusions can be the same size and the area of each protrusion can be less than or equal to the area of an adjacent recess.

A simple component can be created if the protrusions have a thickness which is the same as the thickness of the base body.

Particularly good functioning, namely a good mixing with low levels of flow resistance, is achieved if the protrusions are each delimited by side edges and a front edge, whereby the length of a side edge is between 2 mm and 45 mm, preferably between 20 mm and 30 mm, and in particular 25 mm. The length of the front edge is between 2 mm and 100 mm, preferably between 25 mm and 50 mm, in particular 40 mm.

The object is also achieved by a UV water treatment facility with a channel that is open at the top and a number of elongated, tube-shaped UV emitters arranged in the channel, whereby the channel has two side walls and a base wall, and thereby the UV emitters are arranged parallel to the side walls and not parallel to the base wall, in other words either vertically or angled against the direction of flow in the channel, if furthermore at least one mixing device with a plurality of protrusions is arranged on a side wall parallel to an emitter such that the protrusions extend into the free cross section of the channel during operation.

One recess is preferably provided between each two protrusions in the direction of flow in each case, which recess is a cross section through which water can flow freely.

There is a particularly good mixing of the water flowing at the edge of the channel with a low loss of pressure if the area ratio of the areas of the protrusions effective in the direction of flow to the corresponding areas of the recesses is less than or equal to 1.

The at least one mixing device is preferably arranged upstream before or immediately next to the adjacent UV emitters in the direction of flow.

BRIEF DESCRIPTION OF THE DRAWINGS

An embodiment of the present invention is described below on the basis of the diagrams, whereby.

DETAILED DESCRIPTION OF THE INVENTION

Figure 1:
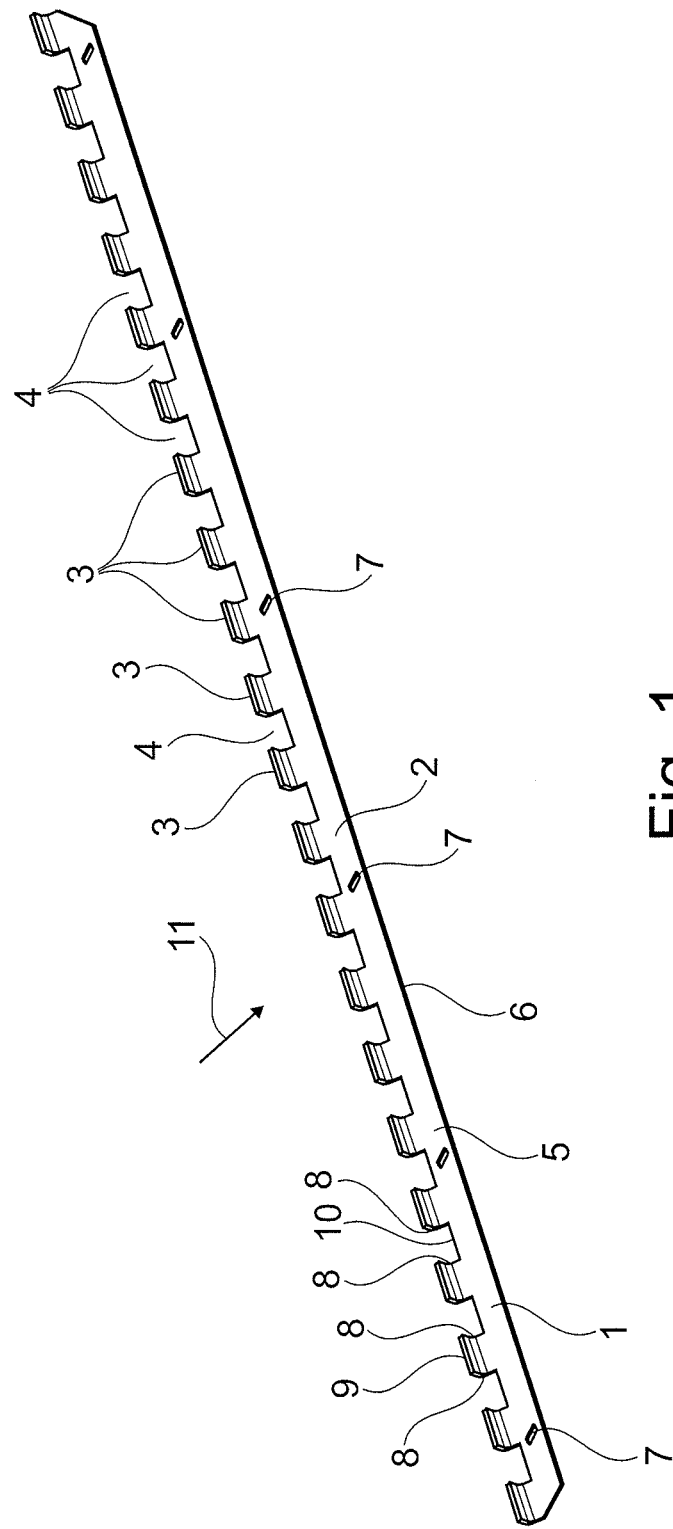
FIG. 1: is a perspective view of a mixing device with rectangular protrusions.

FIG. 1 is a perspective view of a mixing device in accordance with the invention. A mixing device 1 has an elongated, plate-shaped base body 2 and protrusions 3 which extend from this base body. The protrusions 3 are distanced from one another by recesses 4 between them.

In particular, the base body 3 is formed as a metal strip. It has an upper face 5 and a lower face 6 which is not visible in FIG. 1. The base body 2 is penetrated by a total of six elongated holes 7 which are used to attach the mixing device 1 to a wall of a channel of a water treatment device. The protrusions 3 connect to the base body 2 as one piece and are angled upwards relative to the plane of the upper face 5. The protrusions 3 have side edges 8 and a front edge 9. The side edges 8 run in parallel to one another while the front edge 9 extends approximately at right angles to the side edges 8 and connects these to one another. An essentially rectangular protrusion 3 is created.

The recesses 4 are arranged between the protrusions 3. They are delimited by the side edges 8 of the protrusions 3. A lower edge 10 delimits the recess 4 from the base body 2. In total, over the length of the elongated base body 2 there is a regular sequence of protrusions 3 and recesses 4, whereby the protrusions 3 extend over the upper face 5 of the base body 2 in a crenellated manner.

In practice, the mixing device is manufactured from a metal strip, the width of which corresponds to the width of the base body 2 plus the length of a side edge 8. The recesses 4 are then cut into this metal strip in order to form the protrusions 3 between the recesses. Then the protrusions 3 generated in this way are bent in the manner which can be seen in FIG. 1 at approximately right angles upwards from the plane of the upper face 5.

In the region of the recesses 4 the base body 2 is completely flat, so no material extends upwards beyond the upper face 5 of the base body 2 between two adjacent protrusions 3. In this embodiment, in which the side edges 8 are oriented at right angles to the front edge 9 and the lower edge 10, [the area ratio] is determined by the length ratio of the front edge 9 to the lower edge 10. If the lengths of the front edge 9 and the lower edge 10 are equal, the area ratio between the protrusions 3 and the recesses 4 is 1:1. Since the mixing device in accordance with FIG. 1 is placed with its lower face 6 on a wall of a channel during operation and is struck by the flow in the direction of the flow arrow 11, this ratio also determines the flow resistance. For a flow resistance which is as low as possible, it is advantageous if the areas of the protrusions 3 are < or =the areas of the recesses 4, in other words in the case of rectangular protrusions 3 and recesses 4 the length of the front edges 9 is less than or equal to the length of the lower edge 10.

The length of the side edges 8 determines that amount by which the protrusions 9 protrude into the flow of water and cause it to swirl. It is currently preferable if the side edges 8 do not exceed a length of 45 mm, and preferably have a length of 20 mm to 25 mm.

Other configurations of the mixing device which deviate from the rectangular, cement-shaped design of FIG. 1, are also conceivable. The protrusions could also be trapezoid or triangular, although this embodiment is not shown. The recesses between the protrusions then take on a complementary shape to this. Again, it is important that the area ratio between the protrusions and the recesses is less than or equal to 1 regardless of the geometric shape.

Figure 2:
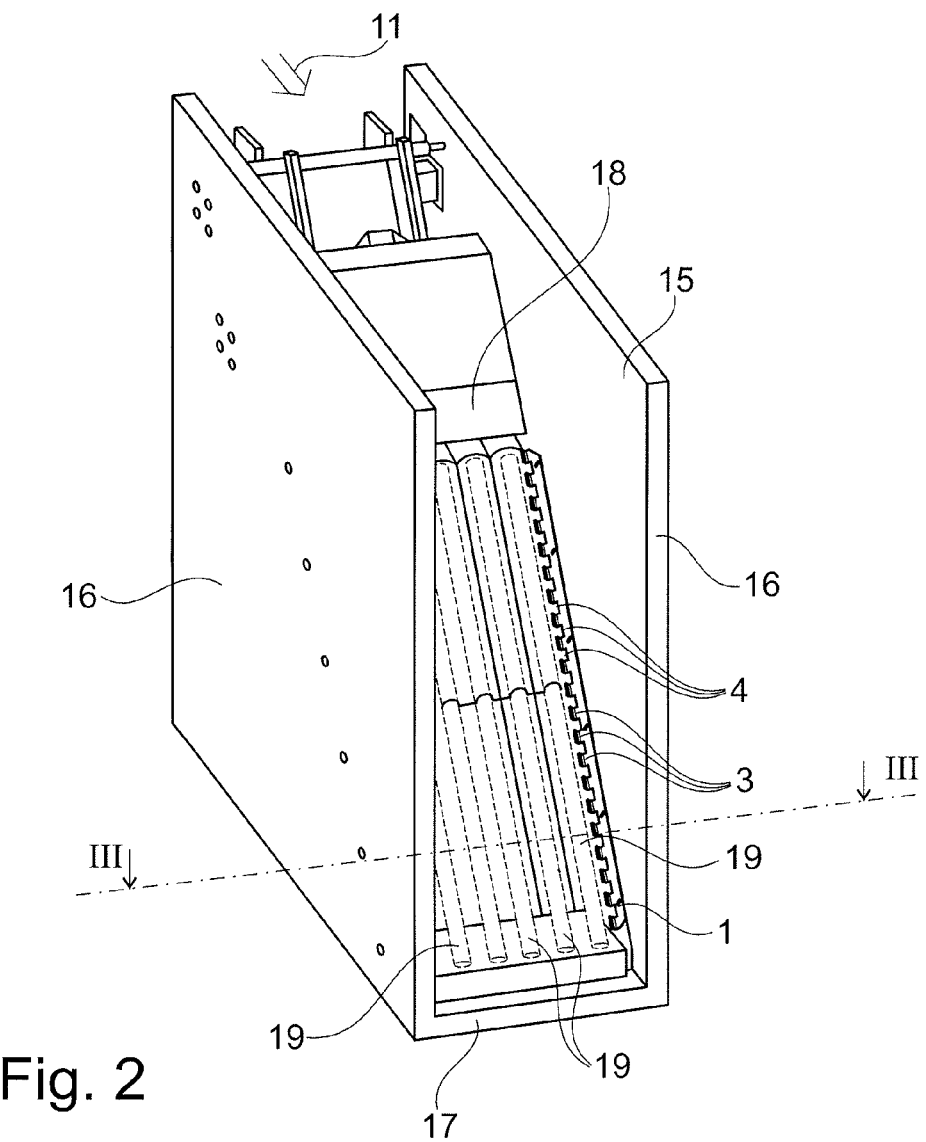
FIG. 2: is a UV water treatment facility with an open channel and mixing devices in accordance with FIG. 1 installed within it.

FIG. 2 is a perspective view of a UV water treatment facility.

The facility has a channel 15 which is open in an upwards direction with side walls 16 and a base wall 17. In the channel 15, through which water flows during operation, an arrangement of emitters 18 is provided which comprises a number of UV emitters 19. The construction of the emitters 19 is known. They are UV mercury low pressure emitters. In FIG. 2, the water flows through the facility from the back to the front in the direction of the flow arrow 11.

Several emitters 19 are provided in the facility to achieve a high radiation intensity. Specifically, the device in FIG. 2 comprises a total of 24 emitters 19. The emitters are in rows which each have six emitters oriented transverse to the direction of flow 11. A total of four rows of six emitters are provided one after the other in the direction of flow 11. In FIG. 2, therefore, the final four rows in the direction of flow are visible. Of the total of six emitters 19 in these last rows, only five are visible as in FIG. 2 the far left emitter is covered by side wall 16 as a result of the perspective view.

The emitter 19 which is on the right in FIG. 2 is at a relatively large distance from the adjacent side wall 16. The mixing device 1 as previously described with reference to FIG. 1 is arranged in this space.

The mixing device 1 is attached parallel to the longitudinal axis of the emitter 19 on the inner face of the side wall 16, and the lower face 6 is adjacent to the side wall 16. The upper face 5 is inclined towards the emitters 19. The protrusions 3 vertical from the side wall 16 are also inclined towards the emitters. The protrusions 3 therefore protrude into the interior of the channel 15.

The UV water treatment facility from FIG. 2 shows a configuration of UV emitters 19 in which the individual emitters are angled against the direction of flow. The mixing device 1 is attached to the side wall 16 at precisely this angle. The precise structure of the UV water treatment device is described below with reference to FIG. 3, which shows a horizontal longitudinal section along the line III-III from FIG. 2.

Figure 3:
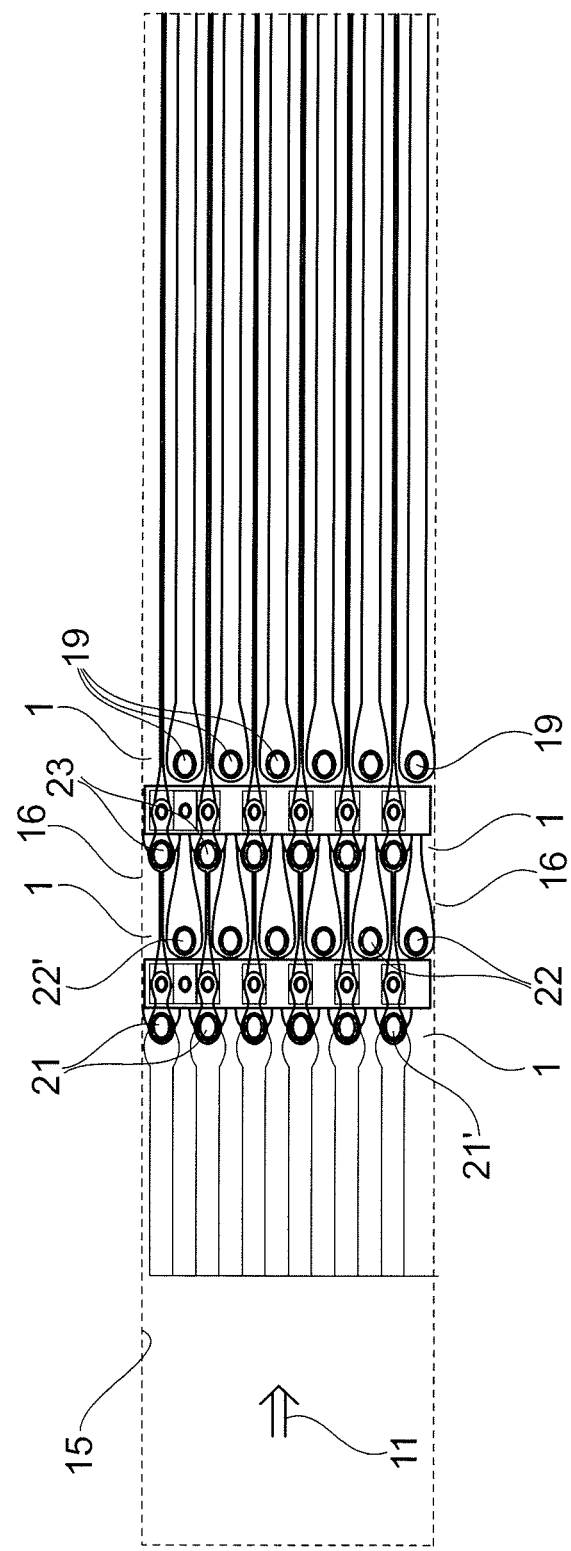
FIG. 3: is a horizontal section of the water treatment facility from FIG. 2 with simulated flow pathways.

FIG. 3 is a plan view of the horizontal longitudinal section along the line III-III from FIG. 2. The channel 15 with the side walls 16 is shown as the delimiter of the flow pathway here, in that the water flows through the water treatment facility in the flow direction 11. Four rows each with six UV emitters are arranged in the direction of flow 11. The upstream row comprises six emitters 21, the second row comprises six emitters 22, the third row in the direction of flow comprises six emitters 23 and the last row comprises the emitters 19 already described in FIG. 2.

The emitters 21 are not evenly distributed over the breadth of the channel 15. Rather, the six emitters 21 in this row are evenly distanced from one another, but are slightly to the left relative to the direction of flow 11, in order words offset in an upwards direction in FIG. 3, so the emitter 21 which is on the left in the direction of flow and which is at the top in FIG. 3, is mounted closer to side wall 16 than the emitter 21', which is on the right in the direction of flow and which is at the bottom in FIG. 3. Consequently, between the emitter 21', which is on the right in the direction of flow, and the side wall 16 there is a gap in which the mixing device 1 is arranged.

The second row of emitters 22 is structured in a similar manner. The emitters 22 are evenly spaced from one another. However, the emitters are offset towards the right relative to the direction of flow, so the right emitter 22, which is shown at the bottom in FIG. 3, is arranged closer to the side wall 16 of the channel 15 than the emitter 22', which is on the left in the direction of flow and which is arranged at the top in FIG. 3.

Accordingly, between the emitter 22' which is at the top in FIG. 3 and the side wall 16 of the channel 15 there is a gap in which, again, a mixing device 1 is arranged.

The described offsetting of the rows of emitters 21 on the one side and 22 on the other results in a design of the two rows relative to one another in which an emitter 22 is arranged in the centre behind the gap which is created between two upstream emitters 21. In this way, a particularly secure arrangement for disinfection is created. Particles which pass between the emitters 21 will strike the emitter 22 almost in the centre. If these particles have received a relatively low dose of UV as they passed between the emitters 21, they will inevitably receive a higher dose of radiation when they pass the subsequent emitter 22. By swirling the water, the mixing devices 1 improve the disinfection in the gap between an emitter and the side wall 16, as there no flow pathways can form near to the wall in which the particles only experience a low UV intensity. The mixing devices also do not cause any noteworthy deflections of the flow pathways of the flow of water in the direction of flow 11, so there is no disruptive acceleration of the flow in this area which would lead to a decreased dose of UV.

The arrangement of the emitters 23 and 19 corresponds to that of the emitters 21 and 22. The emitters 23 are offset towards the left relative to the direction of flow, the emitters 19 towards the right. Two mixing devices 1 are mounted in the gaps which result on the side walls 16, with one mixing device for each row of emitters.

The invention claimed is:

1. A mixing device for a water treatment facility having an open channel, the mixing device comprising:
    a plate-shape or strip-shaped base body attached to a wall of the channel such that a lower face of the mixing device faces towards the wall of the channel during operation and an upper face of the mixing device faces away from the wall of the channel during operation,
    a plurality of protrusions extending from the base body, said protrusions inclined away from the lower face and extending over a plane formed by the upper face, and
    a plurality of recesses, each recess arranged between two adjacent protrusions respectively.

2. The mixing device according to claim 1, wherein the protrusions are formed in one piece with the base body.

3. The mixing device according to claim 1, wherein the protrusions and the recesses are arranged next to one another in a straight line.

4. The mixing device according to claim 1, wherein each protrusion has an area and each recess has an area, and a total of the areas of the protrusions is less than or equal to a total of the areas of the recesses.

5. The mixing device according to claim 1, wherein each protrusion has an area and each recess has an area, the protrusions are the same size, and the area of each protrusion is less than or equal to the area of an adjacent recess.

6. The mixing device according to claim 1, wherein the protrusions each have a thickness which is equal to the thickness of the base body.

7. The mixing device according to claim 1, wherein the protrusions are each delimited by side edges having a length and a front edge having a length, whereby the length of each side edge is between 2 mm and 45 mm and the length of the front edge is between 2 mm and 100 mm.

8. A UV water treatment facility comprising:
    a channel having an open top, two side walls, a base wall, a free cross section, and a flow direction; a number of elongated and tube-shaped UV emitters arranged in the channel, the UV emitters are parallel to the side walls and not parallel to the base wall;
    at least one mixing device having a plurality of protrusions arranged on a side wall parallel to one of the UV emitters with the protrusions protruding into the free cross section of the channel, each protrusion having an area effective in the flow direction, the plurality of protrusions having a total protrusion area effective in the flow direction, each two adjacent protrusions having a recess between them in the flow direction, each recess having an area effective in the flow direction through which water can flow freely, and the mixing device having a total recess area effective in the flow direction, wherein a ratio of the total protrusion area effective in the flow direction and the total recess area effective in the flow direction is less than or equal to 1.

9. The UV water treatment facility according to claim 8, wherein the at least one mixing device is arranged upstream before or immediately next to the adjacent UV emitters relative to the direction of flow.

\* \* \* \* \*